(12) United States Patent
Zeman

(10) Patent No.: US 9,719,742 B2
(45) Date of Patent: Aug. 1, 2017

(54) EMPTY AMMUNITION MAGAZINE BOLT HOLD OPEN DEVICE

(71) Applicant: Bryan Zeman, Lake Havasu City, AZ (US)

(72) Inventor: Bryan Zeman, Lake Havasu City, AZ (US)

(*) Notice: Subject to any disclaimer, the term of this patent is extended or adjusted under 35 U.S.C. 154(b) by 0 days.

(21) Appl. No.: 15/229,645

(22) Filed: Aug. 5, 2016

(65) Prior Publication Data

US 2017/0045324 A1     Feb. 16, 2017

Related U.S. Application Data

(60) Provisional application No. 62/203,129, filed on Aug. 10, 2015.

(51) Int. Cl.
| | |
|---|---|
| *F41A 17/40* | (2006.01) |
| *F41A 17/36* | (2006.01) |
| *F41A 17/42* | (2006.01) |

(52) U.S. Cl.
CPC .............. *F41A 17/36* (2013.01); *F41A 17/40* (2013.01); *F41A 17/42* (2013.01)

(58) Field of Classification Search
CPC ........... F41A 17/36; F41A 17/40; F41A 17/42
See application file for complete search history.

(56) References Cited

U.S. PATENT DOCUMENTS

| | | | | |
|---|---|---|---|---|
| 2,325,395 A | * | 7/1943 | Hammond | F41A 17/36 89/138 |
| 6,070,352 A | | 6/2000 | Daigle | |
| 7,395,747 B2 | * | 7/2008 | Murello | F41A 17/40 42/70.01 |

FOREIGN PATENT DOCUMENTS

| | | | |
|---|---|---|---|
| GB | 613 281 | * | 11/1948 |
| WO | WO 2005/050122 | * | 6/2005 |

* cited by examiner

*Primary Examiner* — Stephen M Johnson
(74) *Attorney, Agent, or Firm* — Wood Herron & Evans LLP

(57) ABSTRACT

For use on a firearm having a removable ammunition magazine, a longitudinally reciprocating bolt, and a pivoting bolt catch member, the present invention provides an empty ammunition magazine bolt hold open mechanism having a longitudinally extending axel pivotally mounted to the firearm for rotation about a longitudinal axis. The axel has a forward lever arm that extends transversely from the axis and is positioned to be engaged by a magazine follower when the magazine is empty of ammunition. Displacement of the forward lever arm causes rotation of the axel. The axel has a rear portion configured to engage the bolt catch and cause pivotal movement of the bolt catch member when the axel is rotated.

6 Claims, 8 Drawing Sheets

EMPTY AMMUNITION MAGAZINE BOLT HOLD OPEN DEVICE

RELATED APPLICATIONS

This application claims priority to U.S. Provisional Patent Application No. 62/203,129, filed Aug. 10, 2015, and incorporates the same herein by reference.

FIELD OF THE INVENTION

This invention relates to a last round bolt hold-open device for a AR15-pattern firearm variant that has been modified for pistol caliber ammunition. More specifically, it provides a device capable of reliable actuation by GLOCK®-style magazines.

BACKGROUND OF THE INVENTION

AR15-pattern lower receivers that are configured to accept common pistol caliber magazines are well-known and increasing in popularity. A common caliber for such variant firearms is the 9×19 mm Parabellum, because of its wide-spread popularity as a pistol round. Likewise, due to the popularity of GLOCK® handguns and readily-available magazines for GLOCK® handguns in this caliber, it is a natural choice to configure these modified AR15-pattern receivers to accept these popular ammunition magazines.

In a semi-automatic firearm, the preference is for the design to include a feature that allows the bolt to be automatically held back in the open position after the last round of ammunition is fired from the magazine. When making a variant of an AR15-pattern firearm, it is preferred to use as many standard parts as possible, both because such parts are widely available at low cost and because the user is more likely to already have familiarity with the placement and operation of the various operational controls.

AR15-pattern lower receivers use a bolt catch mechanism that is not compatible with GLOCK®-pattern magazines without significant adaptation. Known prior art devices typically use a member formed from sheet metal in an attempt to transfer the actuation motion of the GLOCK® magazine follower to the bolt catch member mounted on the lower receiver. As illustrated in FIG. 1, these prior art devices rely purely on up and down motion exerted on a thin sheet metal finger to transfer the upward motion from the magazine follower to the bolt catch member. The prior art lower receiver 10 includes a cavity 12 positioned aft of the magazine well 14 to receive a vertically slidable bolt catch actuator 16 which extends forwardly to engage the magazine follower and lift a blocking portion 18 of the bolt catch member 20 when an ammunition magazine (not shown in FIG. 1) is inserted in the magazine well 14 and is empty. These mechanisms are notoriously unreliable due to the sheet metal's flexibility, unsuitable leverage points against an extended finger of the actuator 16, and the requirement for significant machining to the lower receiver 10.

SUMMARY OF THE INVENTION

For use on a firearm having a removable ammunition magazine, a longitudinally reciprocating bolt, and a pivoting bolt catch member, the present invention provides an empty ammunition magazine bolt hold open mechanism having a longitudinally extending axel pivotally mounted to the firearm for rotation about a longitudinal axis. The axel has a forward lever arm that extends transversely from the axis and is positioned to be engaged by a magazine follower when the magazine is empty of ammunition. Displacement of the forward lever arm causes rotation of the axel. The axel has a rear portion configured to engage the bolt catch and cause pivotal movement of the bolt catch member when the axel is rotated.

The axel may be mounted to an upper receiver of the firearm. In such an embodiment, the axel rear portion may have a rear lever arm extending substantially upwardly from the axis and positioned to engage a lever portion of the bolt catch on a lower receiver and to cause pivotal movement of the pivoting bolt catch member when the axel is rotated. It may also include an axel cover member attached to the upper receiver to secure the axel to the upper receiver.

Alternatively, the axel may be mounted to a lower receiver of the firearm. In such an embodiment, the axel may be coaxial with a pivot axis of the pivoting bolt catch member.

The present invention provides an improved mechanism for actuating the bolt hold-open device of an AR15-pattern lower receiver configured to use GLOCK™-pattern magazines. Unlike prior art devices that require extensive machining and use a slidable sheet metal actuator finger, the present invention uses an axially extended lever arm that translates upward movement of the magazine follower into rotational movement to actuate the standard AR15-pattern bolt catch/release member. Embodiments of the mechanism may be incorporated into either the upper receiver or the lower receiver and provides a very compact and self-contained device for reliable and effective operation.

Other aspects, features, benefits, and advantages of the present invention will become apparent to a person of skill in the art from the detailed description of various embodiments with reference to the accompanying drawing figures, all of which comprise part of the disclosure.

BRIEF DESCRIPTION OF THE DRAWINGS

Like reference numerals are used to indicate like parts throughout the various figures of the drawings, wherein.

DETAILED DESCRIPTION OF THE INVENTION

Figure 1:
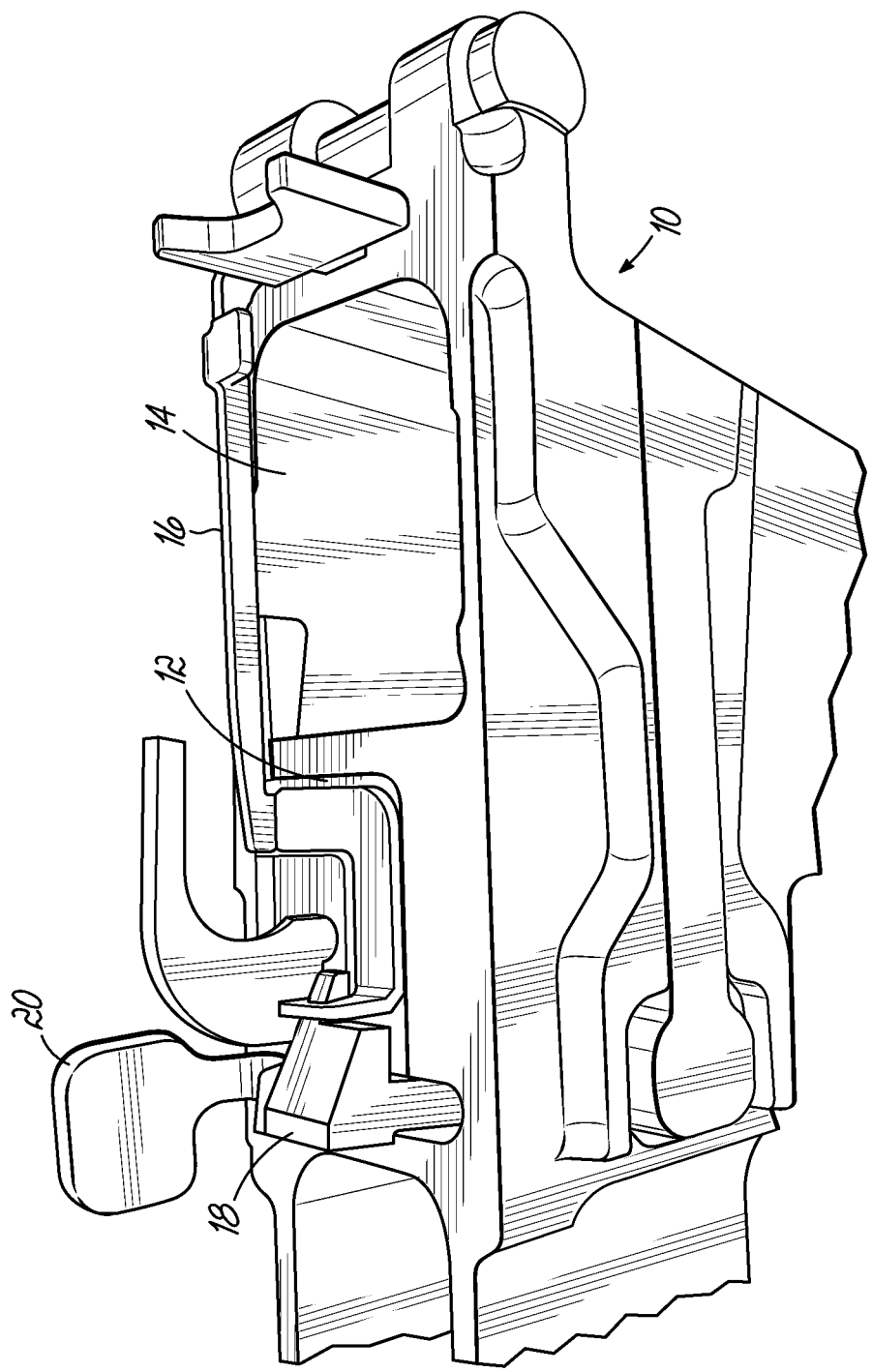
FIG. 1 is a fragmentary isometric view of a prior art pistol caliber AR15-pattern lower receiver and bolt hold-open actuator adapted for use with GLOCK®-pattern magazines.

The present invention provides an empty ammunition magazine bolt hold open mechanism for use with an AR15-pattern firearm that is modified to fire pistol caliber ammunition. In particular, it may be used with a lower receiver that is configured to accept GLOCK™-pattern magazines.

With reference to the drawing figures, this section describes particular embodiments and their detailed construction and operation. Throughout the specification, reference to "one embodiment," "an embodiment," or "some embodiments" means that a particular described feature, structure, or characteristic may be included in at least one embodiment. Thus appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

Figure 2:
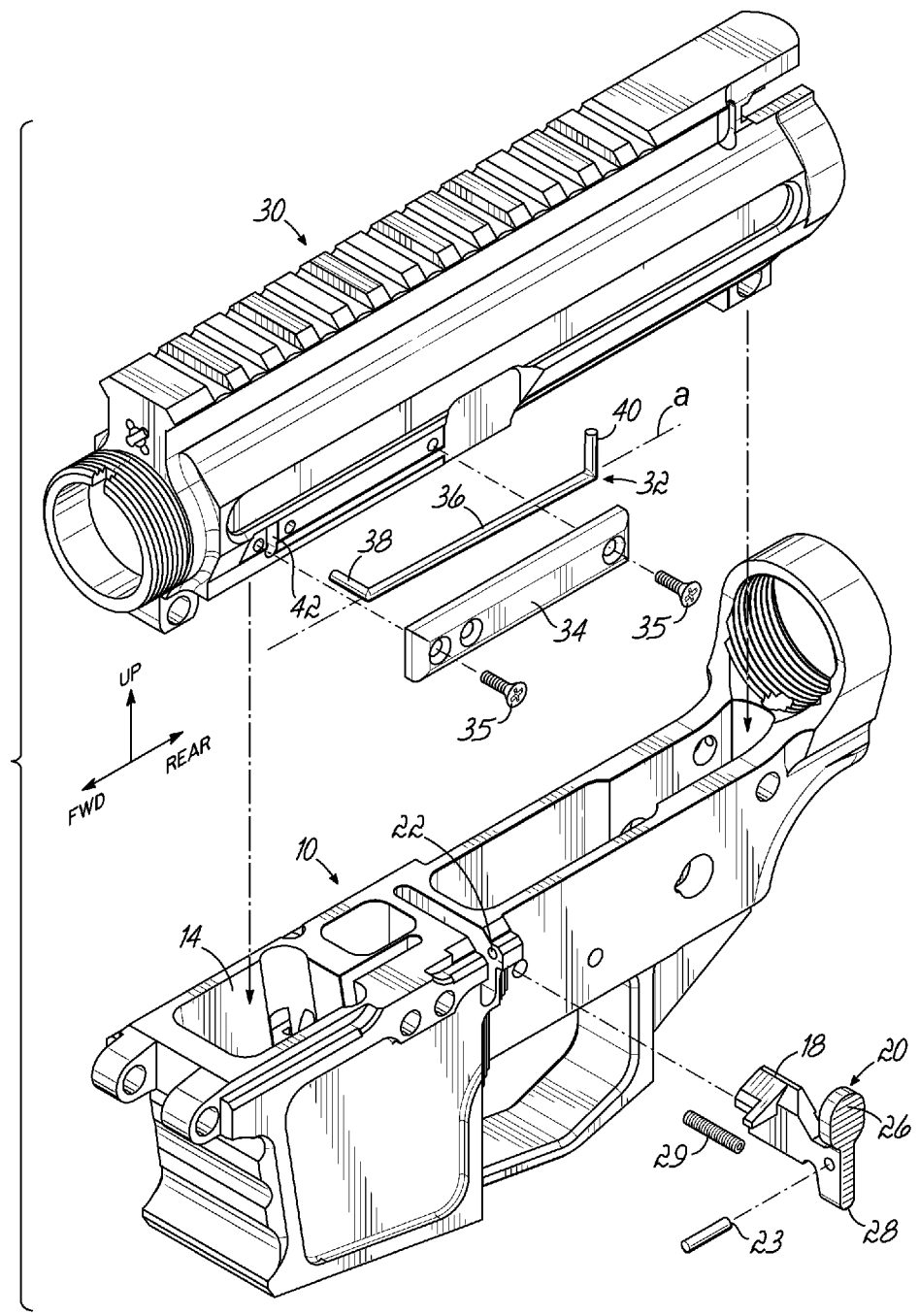
FIG. 2 is an exploded isometric view of AR15-patterned upper and lower receivers configured according to the one embodiment of the present invention.

One embodiment is shown in FIG. 2, wherein a lower receiver 10 having a magazine well 14 configured to accept a pistol magazine, such as a GLOCK™-pattern magazine in 9×19 mm Parabellum. A component part of the lower receiver 10 is a bolt catch member 20. The bolt catch member 20 shown is of the ordinary or "standard" type used in an AR15-pattern lower receiver. It is pivotally mounted to the lower receiver 10 by means of an axel pin 23 that extends through a longitudinal opening 22 on the lower receiver 10 and a corresponding opening 24 on the bolt catch member 20. This allows the bolt catch member 20 to pivot between a position in which the blocking portion 18 is lowered (FIGS. 2-5) to allow the bolt (not shown) to pass and a raised position (FIG. 6) that catches the bolt and holds it in an open position. Positioned exterior of the lower receiver 10 are a bolt release lever portion 26 and a bolt lift lever portion 28. The bolt catch member 20, when installed, is biased by a spring 29 toward the lowered or bolt-release position.

According to one embodiment of the present invention, an upper receiver 30 is adapted to accept a transfer bar 32 held in place by a cover member 34, that may be attached to the upper receiver 30, such as with one or more threaded fasteners 35. The transfer bar 32 includes an elongated axel portion 36 extending along longitudinal pivot axis a with a transversely extending first arm 38 at a forward end thereof and a transversely extending second arm 40 at a rearward end thereof. An opening 42 is provided in the upper receiver 30 to accept the first arm 38 of the transfer bar 32.

Figure 3:
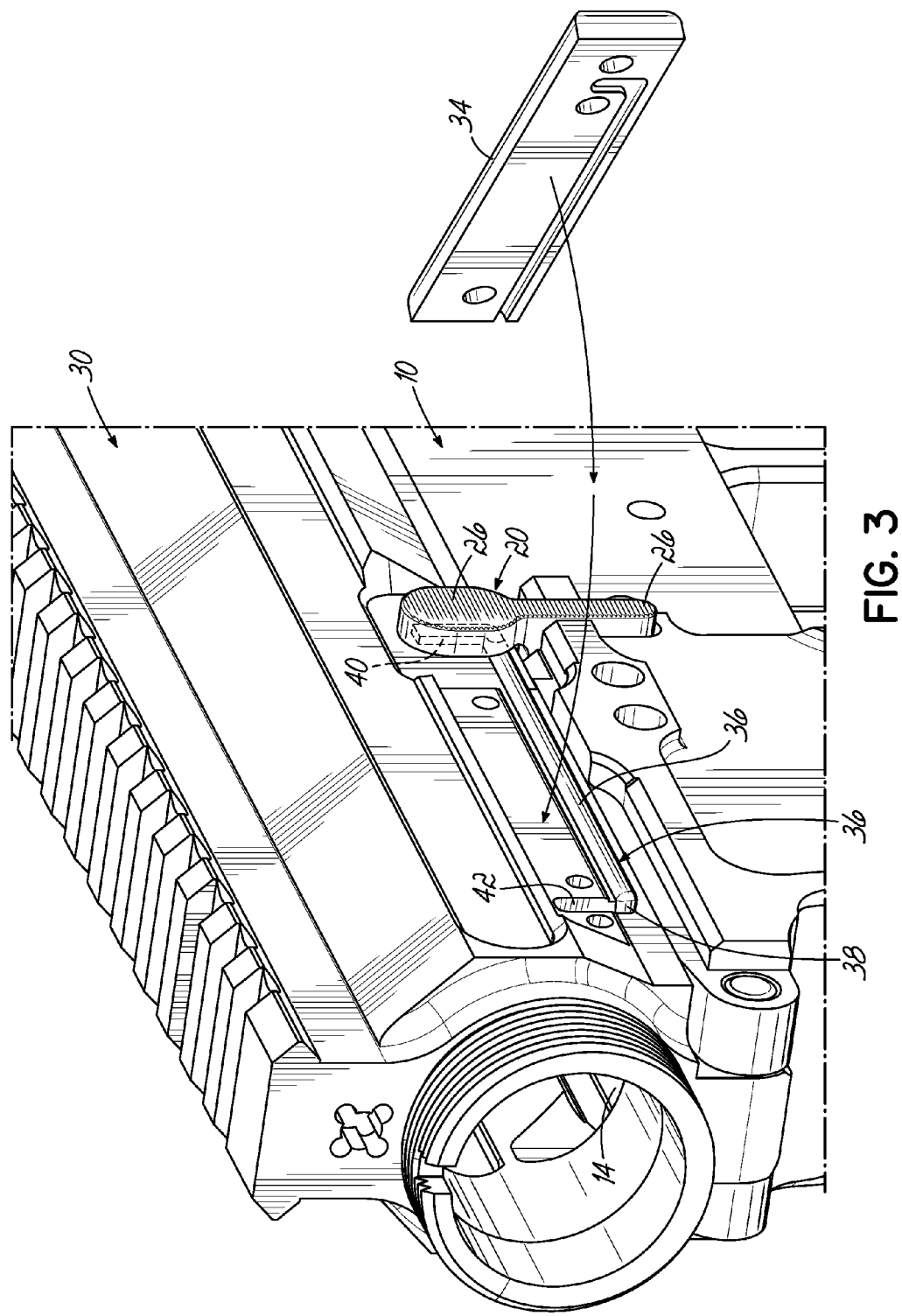
FIG. 3 is a fragmentary isometric assembled view of the device with the cover member removed.

Referring now also to FIG. 3, the upper receiver 30 is shown assembled to the lower receiver 10, with the transfer bar 32 operably positioned on an exterior surface of the upper receiver 30. When assembled, the first arm 38 extends through the opening 42. The axel portion 36 extends longitudinally along and outboard of the upper receiver 30 and the second arm 40 is positioned between the upper receiver 30 and bolt release lever portion 26 of the bolt catch member 20. For clarity, the cover 34 is not shown in FIG. 3. When the cover 34 is installed, the transfer bar 32 is held in place against the upper receiver 30 in a manner that allows axial rotation of the axel portion 36 along longitudinal pivot axis a (shown in FIG. 2) and prevents longitudinal movement thereof.

As seen in FIGS. 2 and 3, the first and second arms 38, 40 of the transfer bar 32 extend at approximately right angles from the axel portion 34 and at approximately right angles relative to each other. In this manner, the transfer bar 32 acts as an axially extended or spaced-apart crank arm, such that upward displacement of the first arm 38 is rotationally transferred through the axel portion 36 to outboard rotation of the second arm 40. Alignment of the second arm 40 with the bolt catch member 20 is such that outboard rotation of the second arm 40 bears against an inboard side of the bolt release lever portion 26 the bolt catch member 20 to pivot the bolt catch member 20 and cause the blocking portion 18 to be lifted into position to block the bolt in an open position. The bolt can still be manually released by pressing the bolt release lever portion 26 of the bolt catch member 20 in the usual way. Likewise, the blocking portion 18 of the bolt catch member 20 can be manually lifted by pressing the bolt lift lever portion 28 in the usual manner.

Figure 4:
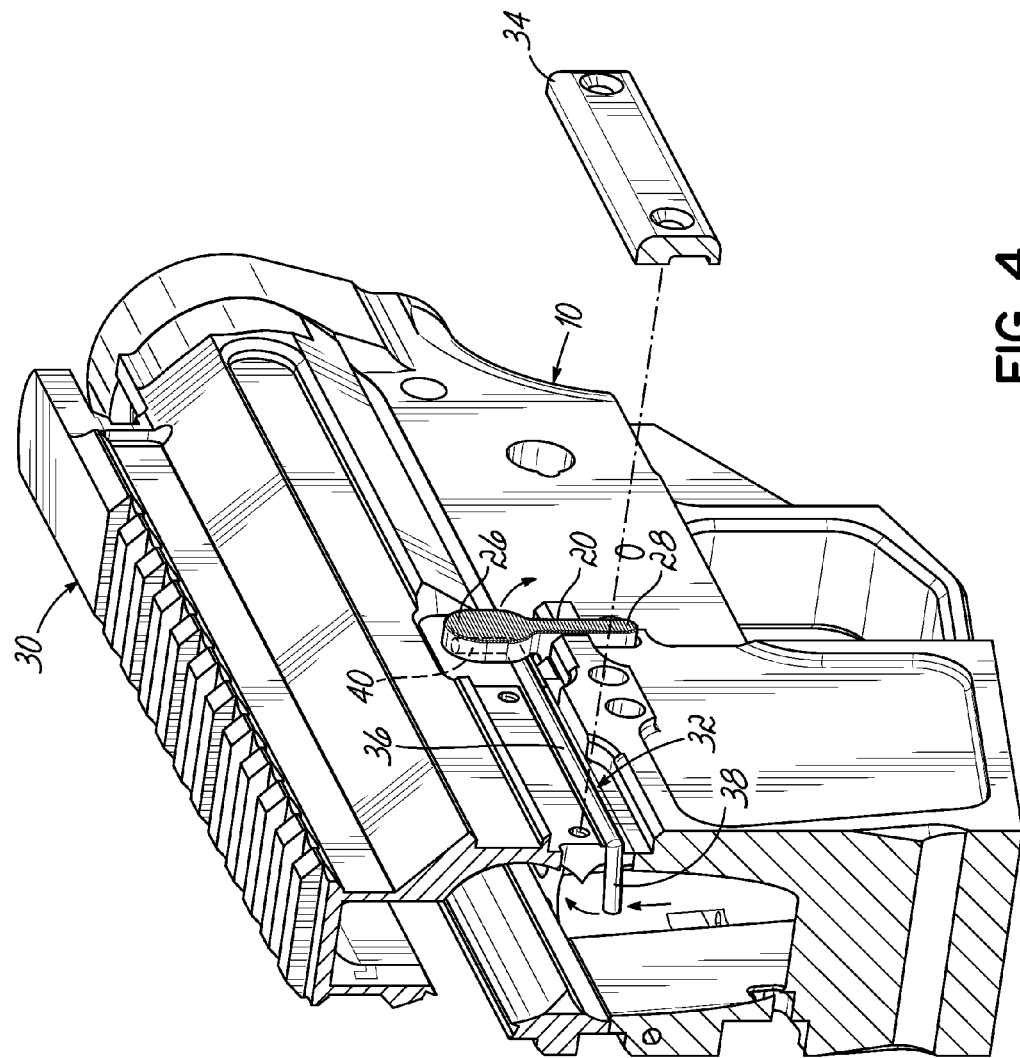
FIG. 4 is a transversely sectioned isometric assembled view thereof.
Figure 5:
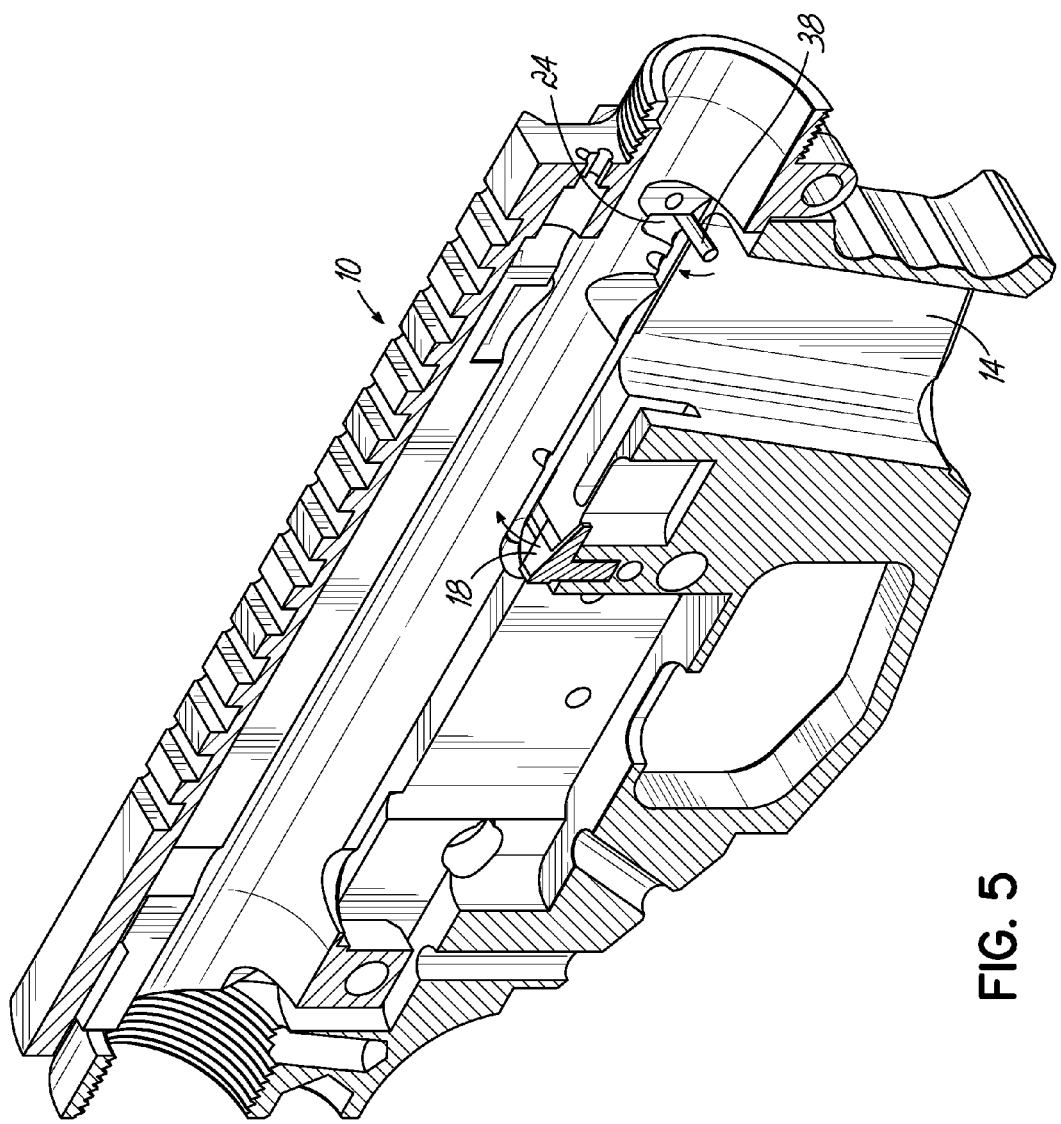
FIG. 5 is a longitudinally sectioned isometric assembled view thereof.
Figure 6:
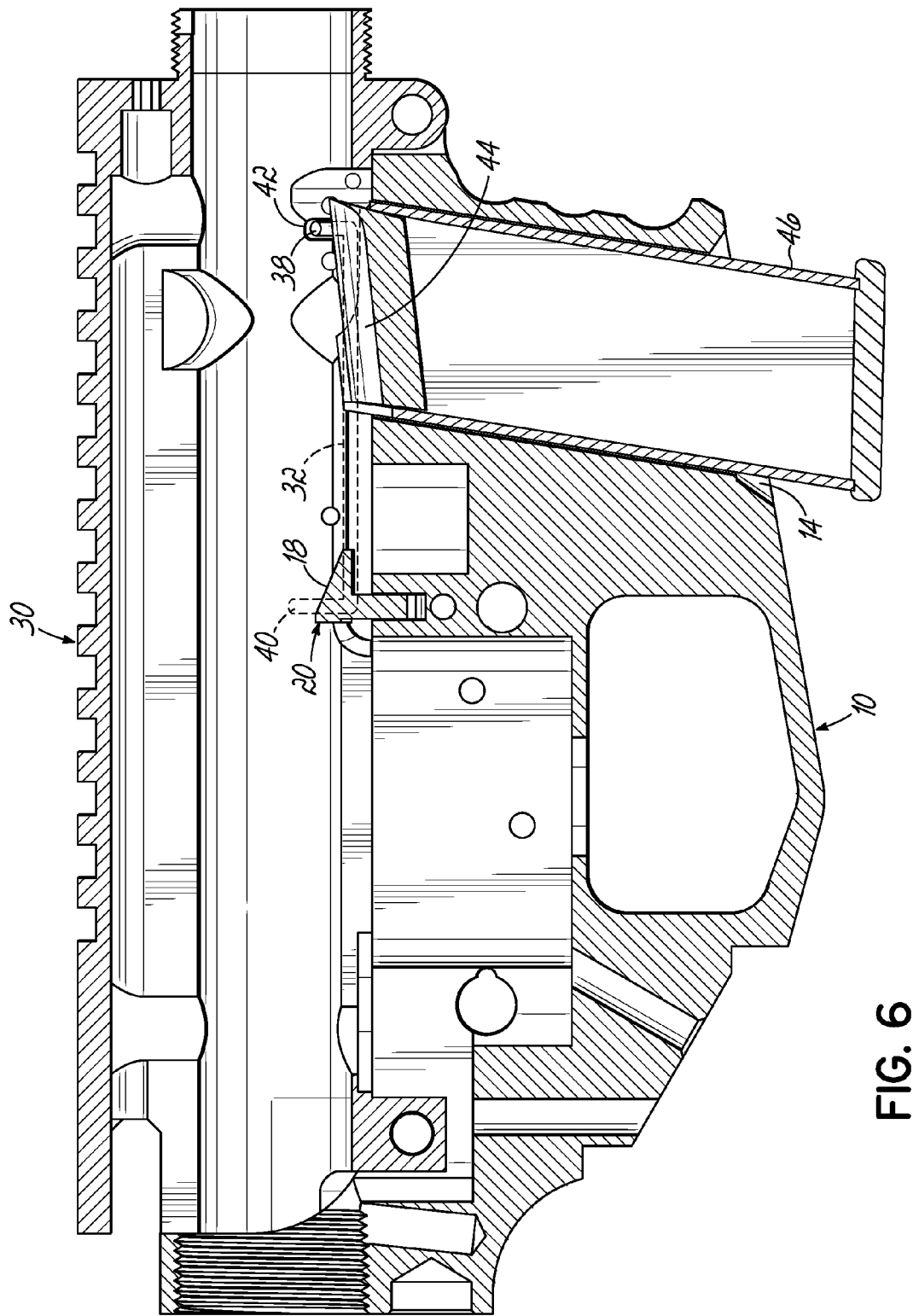
FIG. 6 is a longitudinally sectioned side plan view of an upper and lower receiver according to one embodiment of the present invention with an ammunition magazine installed therein.

Referring now also to FIGS. 4 and 5, therein can be seen how the first arm 38 of the transfer bar 32 extends through the opening 42 of the upper receiver 30 into a position to be contacted by the follower 44 of a GLOCK™-pattern magazine 46 when the ammunition is depleted. Accordingly, the blocking portion 18 of the bolt catch member 20 is shown in the elevated position in FIG. 6.

Embodiments of the present invention using the illustrated transfer bar 32 may be made at relatively low cost, with relatively simple machining modification to the upper receiver 30, and with far greater reliability of operation compared to prior art mechanisms. Alternatively, the lower receiver 10 could be modified to support the transfer bar 32 in the illustrated position on an outboard, flange (now shown) upwardly extending from the lower receiver 10.

Figure 7:
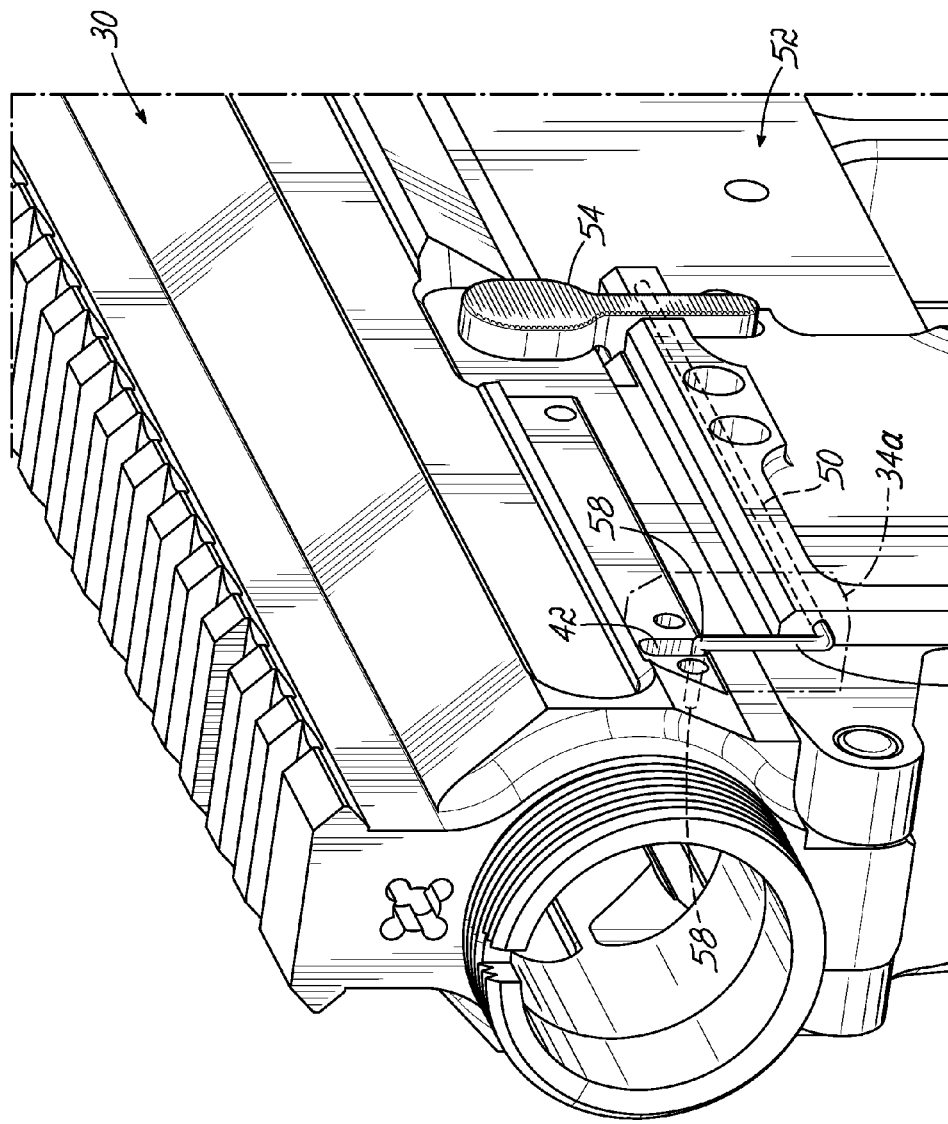
FIG. 7 is a fragmentary isometric assembled view according to an alternate embodiment of the invention.

An alternate embodiment of the present invention is illustrated in FIG. 7. In this embodiment, the axel portion 36 of the transfer bar 48 extends through a longitudinal passageway 50 formed in the lower receiver 52. The transfer bar 48 functions as the mounting pin/pivot axis for the bolt catch member 54 and is keyed or otherwise fixed such that rotation of the transfer bar 48 causes pivotal rotation of the bolt catch member 54. At the forward end of the transfer bar 48 is an upwardly extending arm 56 which includes an inwardly extending cam portion 58. This cam portion 58 engages the magazine follower 44 such that upward force provided by the follower 44 pushes the arm 56 outwardly, causing rotation of the transfer bar 48 and bolt catch member 54. A cover 34a can be installed over the exposed portion of the transfer bar 48 and upwardly extending arm 56, if desired. In this manner, the empty ammunition magazine bolt hold open device may be completely integral to the lower receiver 52 and the only required modification to the upper receiver 28 is provision of the side opening 40.

Figure 8:
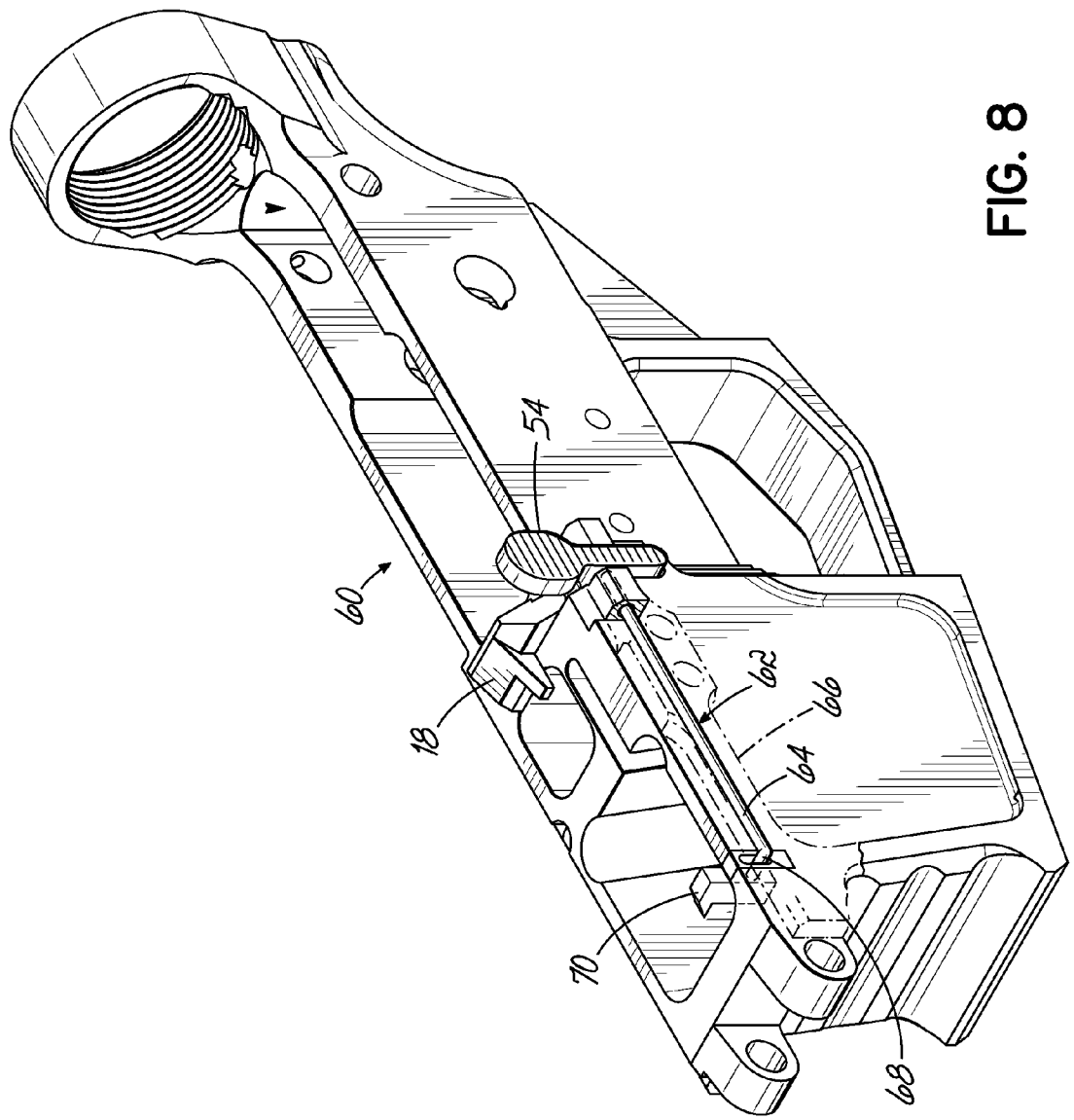
FIG. 8 is a isometric view of a lower receiver according to another alternate embodiment of the invention.

Yet another alternate embodiment concept of the present invention is illustrated in FIG. 8. In this embodiment, last round bolt hold-open mechanism is completely contained within the lower receiver 60 and no modification of the upper receiver is required. As in the previously described embodiment, a rear portion of the transfer bar 62 functions as the mounting/pivot pin for the bolt catch member 54 and is keyed or otherwise fixed such that rotation of the transfer bar 62 causes pivotal rotation of the bolt catch member 54. The extended axel portion 64 of the transfer bar 62 may be held in place and guided by a removable cover 66. At the forward end of the transfer bar 62 is a transversely extending arm 68 that engages a vertically slidable follower hook 70 carried or positioned on the receiver 60 to be lifted by the magazine follower 44 when the magazine 46 is empty. Vertical movement of the follower hook 70 moves the arm 68 of the transfer bar 62, causing axial rotation of the transfer bar 62 and bolt catch member 54. In this manner, the empty ammunition magazine bolt hold open device may be completely integral to the lower receiver 52 with no modification to the upper receiver 28.

While exemplary embodiments of the present invention have been shown and described in detail, it should be apparent to a person skilled in the art that many modifications and variations are possible, all of which fall within the true spirit and scope of the invention. Therefore, the foregoing is intended only to be illustrative of the principles of the invention. Further, since numerous modifications and changes will readily occur to those skilled in the art, it is not intended to limit the invention to the exact construction and operation shown and described. Accordingly, all suitable modifications and equivalents may be included and considered to fall within the scope of the invention, defined by the following claim or claims.

What is claimed is:

1. On a firearm having a removable ammunition magazine, a longitudinally reciprocating bolt, and a pivoting bolt catch member, an empty ammunition magazine bolt hold open mechanism, comprising:
    a longitudinally extending axel having a longitudinal axis and mounted to the firearm for rotation about the longitudinal axis;
    a forward lever arm extending from the axel transversely to the axis and positioned to be engaged by a magazine follower when the magazine is empty of ammunition, upward displacement of the forward lever arm causing rotation of the axel;
    the axel having a rear portion configured to engage the bolt catch member and cause pivotal movement of the bolt catch member when the axel is rotated.

2. The mechanism of claim 1, wherein the axel is mounted to an upper receiver of the firearm.

3. The mechanism of claim 2, the axel rear portion having a rear lever arm extending substantially upwardly from the axis and positioned to engage a lever portion of the bolt catch member on a lower receiver and to cause pivotal movement of the pivoting bolt catch member when the axel is rotated.

4. The mechanism of claim 2, further comprising an axel cover member attached to the upper receiver to secure the axel to the upper receiver.

5. The mechanism of claim 1, wherein the axel is mounted to a lower receiver of the firearm.

6. The mechanism of claim 1, wherein the axel is coaxial with a pivot axis of the pivoting bolt catch member.

* * * * *